(12) United States Patent
Farley et al.

(10) Patent No.: US 8,693,317 B2
(45) Date of Patent: *Apr. 8, 2014

(54) SYSTEM AND METHOD FOR BACKUP COMMUNICATION USING POWER OVER ETHERNET

(75) Inventors: Joseph D. Farley, Warwick, MA (US); Werner Schuhmann, Munich (DE); Heinrich Zettler, Munich (DE)

(73) Assignees: Tyco Fire & Security GmbH, Neuhausen am Rheinfall (CH); Total Walther GmbH, Feuerschutz und Sicherheit, Cologne (DE)

( * ) Notice: Subject to any disclaimer, the term of this patent is extended or adjusted under 35 U.S.C. 154(b) by 71 days.

This patent is subject to a terminal disclaimer.

(21) Appl. No.: 13/301,934

(22) Filed: Nov. 22, 2011

(65) Prior Publication Data

US 2013/0128724 A1 May 23, 2013

(51) Int. Cl.
*H04L 12/26* (2006.01)
(52) U.S. Cl.
USPC ............................ 370/225; 370/220; 370/231
(58) Field of Classification Search
USPC .......... 370/216, 220, 225, 445; 379/131, 111, 379/77, 215.01
See application file for complete search history.

(56) References Cited

U.S. PATENT DOCUMENTS

| | | | | |
|---|---|---|---|---|
| 3,946,159 | A * | 3/1976 | Fay | 725/84 |
| 5,561,412 | A * | 10/1996 | Novak et al. | 340/286.07 |
| 6,470,080 | B2 * | 10/2002 | Perlmutter | 379/219 |
| 6,711,698 | B1 * | 3/2004 | Marbach et al. | 714/4.1 |
| 7,071,820 | B2 * | 7/2006 | Callaway | 340/539.12 |
| 7,478,251 | B1 * | 1/2009 | Diab et al. | 713/300 |
| 7,583,703 | B2 * | 9/2009 | Bowser et al. | 370/487 |
| 7,856,032 | B2 * | 12/2010 | Berkman | 370/463 |
| 8,020,013 | B2 * | 9/2011 | Lin | 713/310 |
| 8,310,365 | B2 * | 11/2012 | Siegler et al. | 340/541 |
| 2004/0190464 | A1 | 9/2004 | Tesdahl et al. | |

(Continued)

FOREIGN PATENT DOCUMENTS

EP 1632666 A2 2/2006
EP 2093988 A2 8/2009

(Continued)

OTHER PUBLICATIONS

International Search Report and Written Opinion from corresponding PCT/US2012/066208.

(Continued)

*Primary Examiner* — Rasheed Gidado
(74) *Attorney, Agent, or Firm* — Kacvinsky Daisak PLLC (57) ABSTRACT

A system and method for providing backup communications using Power over Ethernet (PoE) are disclosed. A backup communication system (BCS) is provided as part of a networked (TCP/IP) hospital communication system. The BCS is coupled to a power line used to provide power to a PoE switch. When TCP/IP communications are interrupted, the BCS receives patient call signals from patient room terminals over a secondary communication mode of the power line, and transmits those call signals to a nurses' station. The call signals can be generated by coupling a pulse-coded AC signal onto the PoE wires, or by sending voltage coded data in one direction and current-coded data in the other direction. Different signals or signal levels can be used to distinguish normal patient calls, patient emergency calls, and code calls. Thus, basic communications can be achieved when TCP/IP are unavailable. Other embodiments are disclosed and claimed.

23 Claims, 8 Drawing Sheets

(56) References Cited

U.S. PATENT DOCUMENTS

| | | | |
|---|---|---|---|
| 2007/0147354 A1* | 6/2007 | He | 370/352 |
| 2009/0003373 A1* | 1/2009 | Morrissey et al. | 370/445 |
| 2009/0212925 A1* | 8/2009 | Schuman et al. | 340/286.07 |

FOREIGN PATENT DOCUMENTS

| | | | |
|---|---|---|---|
| GB | 2468925 A | 9/2010 | |
| WO | 2005/043363 A1 | 5/2005 | |
| WO | 2006/055163 A1 | 5/2006 | |

OTHER PUBLICATIONS

International Search Report and Written Opinion dated Mar. 26, 2012, for corresponding PCT/US2012/066243 filed Nov. 21, 2012.

* cited by examiner

SYSTEM AND METHOD FOR BACKUP COMMUNICATION USING POWER OVER ETHERNET

FIELD OF THE DISCLOSURE

The disclosure relates generally to systems and methods for communicating between components of a patient care system, and more particularly to a system and method for providing backup communications over Ethernet cabling when TCP/IP communications failures occur in a patient care system.

BACKGROUND OF THE DISCLOSURE

Hospitals typically include a variety of devices in patient rooms to enable the patient to communicate with a nurses' station. The hospital room communication devices may include a nurse call button, a microphone, a speaker, and the like. These devices enable the patient, or a nurse in the patient's room, to exchange a variety of emergency and non-emergency information with the nurses' station. These communications devices can be implemented as part of a larger network that services multiple rooms and floors of a hospital. Such networks may implement a TCP/IP protocol in which the hospital room devices are individually addressable, which enables a networked monitoring system to recognize which room a call is coming from.

As will be appreciated, these room communications devices can be used in the event of a patient emergency. As such, it is important that the devices be functional at all times. Where a portion of the communication network malfunctions, however, continued communication between patient rooms and nurses' stations can be compromised. Current systems address this issue by employing one or more additional Ethernet cables, connected between the room communications devices and the nurses' station, to provide a dedicated path for the room communications devices.

SUMMARY

Such redundant Ethernet cabling solutions, however, suffer from the obvious disadvantage that the additional cables are costly and are time consuming to install. Such redundant cable solutions also necessitate the use of an additional intelligent device to connect the additional cable to so that communications can proceed even when the normal network communication mode fails. This further increases hardware and installation costs.

A system and method are disclosed for communicating basic system status (e.g., patient calls) over Ethernet cabling even when some components of the TCP/IP system have failed. The disclosed system employs a single Ethernet cable for normal TCP/IP communication as well as backup communications when the TCP/IP gateway is non-functional. Thus, the disclosed system and method communicate over the power wires provided using the Ethernet connection by one of two methods: (1) coupling a pulse-coded AC signal onto the Ethernet wires, or (2) communicating over the Ethernet wires with voltage-coded data in one direction (supply side to supplied device) and current-coded data in the other (supplied device to supply side).

In an embodiment employing the first method, nodes communicate amongst themselves using an AC signal coupled onto the power-carrying wires using an AC signal source such as an oscillator, multi-vibrator, or equivalent, with capacitive coupling. The receiving side uses a filter and decoding logic.

In an embodiment employing the second method, powered devices communicate by drawing large periodic transient current, while communications to powered devices employs periodic transient voltage drops. In one exemplary embodiment, an FET normally shunts a zener diode or equivalent to maintain the normal power connection. It then periodically turns off the FET and hence momentarily reduces the voltage at the powered devices. The powered devices then communicate back by drawing current pulses, pulsing the transistor and a resistor. Other forms of power line communication over the Ethernet connections could also be used, for example, using RS485 signaling on the power lines.

Communication may be unidirectional or bidirectional, among powered nodes, or to a system "master." This backup form of communication could be used in any application where some form of signaling is critical (e.g., fire alarm, nurse call, medical device, security). The system and method may be included as part of an Ethernet Switch or a mid-span Power over Ethernet ("PoE") device in conjunction with any of the aforementioned systems.

A method is disclosed for providing backup communication of calls in a patient communication system, comprising: receiving, at a backup communication system (BCS) module, a first call signal from a patient call device; and transmitting, from the BCS module, a second call signal to a monitoring device, the second call signal being representative of the first call signal; where the first call signal is transmitted on a secondary communication mode of power carrying wires of an Ethernet cable, and where the secondary communication mode is different from a primary communication mode of the Ethernet cable.

A system is disclosed for providing backup communication over an Ethernet cable. The system includes a backup communication system (BCS) module for receiving a first call signal from a patient room terminal. The BSC module may be configured to transmit a second call signal to a monitoring device, where the second call signal is representative of the first call signal. The first call signal may be transmitted on a secondary communication mode of power carrying wires of an Ethernet cable. The secondary communication mode can be different from a primary communication mode of the Ethernet cable.

BRIEF DESCRIPTION OF THE DRAWINGS

By way of example, a specific embodiment of the disclosed device will now be described, with reference to the accompanying drawings, in which.

DETAILED DESCRIPTION

Figure 1A:
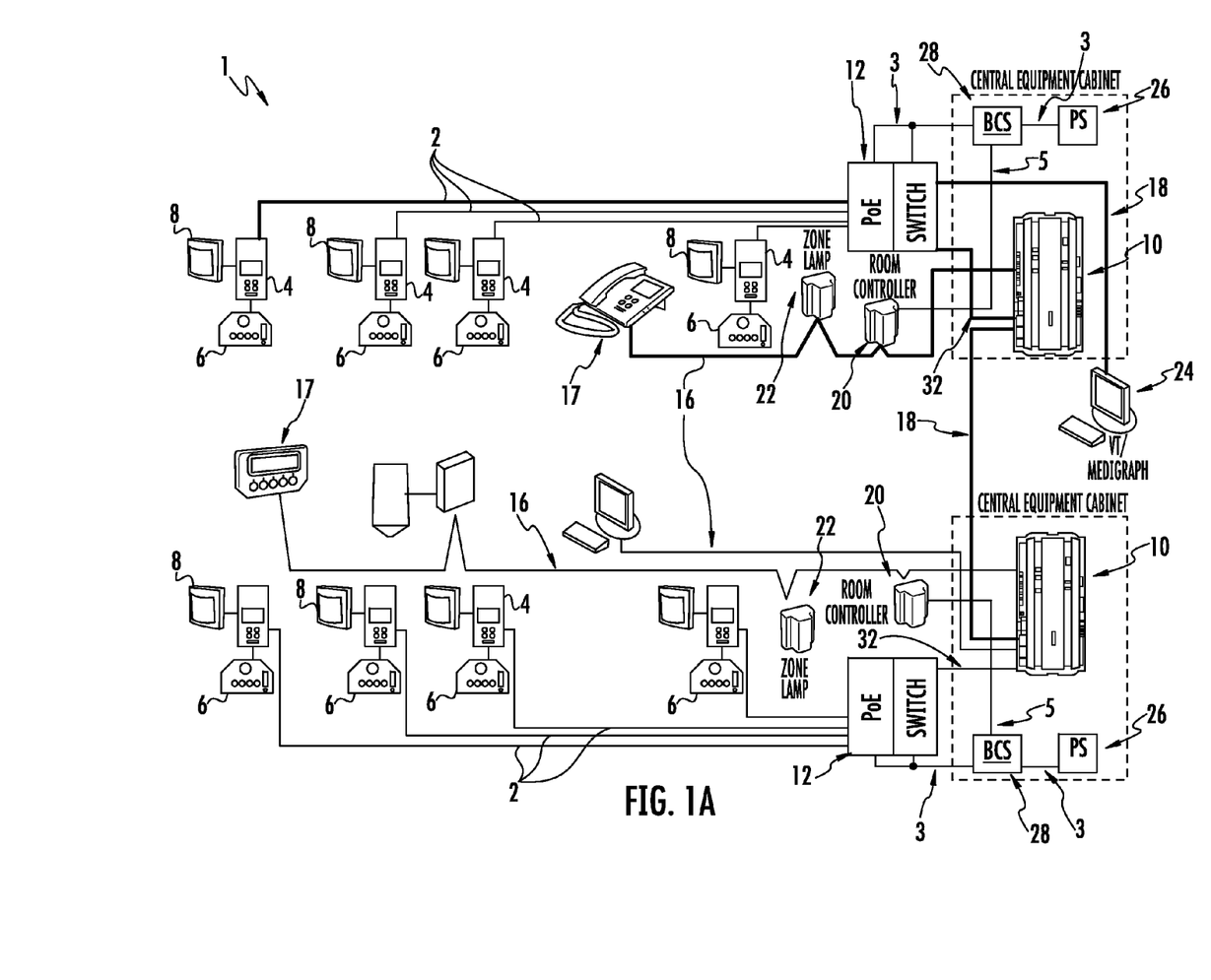
FIG. 1A is a schematic of an exemplary communications system for use in exchanging information between a plurality of patient rooms and at least one monitoring station.

Referring to FIG. 1A, an exemplary networked communication system 1 is shown for use in exchanging information between a plurality of patient rooms and at least one monitoring station. The system 1 includes Ethernet cabling 2 connected to a variety of patient room terminals 4. The patient room terminals 4 can include one or more communication devices, which can include, for example, a patient call device 6 and a room light 8. In general, room terminal 4 is mounted on the wall inside the door of the patient room, and is coupled to the patient call device 6, which is mounted on the wall adjacent to the patient bed. The room light 8 is typically mounted outside the room, in the hall, above the doorway. The Ethernet cabling 2 may connect the room terminals 4 to a network server 10 via a Power over Ethernet (PoE)/Switch 12. Generally, PoE refers to the transmission of electrical power, along with data, on Ethernet cabling such as Ethernet cabling 2. The current Institute of Electrical and Electronics Engineers (IEEE) standard (e.g. IEEE 802.3 at) requires the use of category 5 cable for high power levels (e.g. 25.5 W), but PoE can operate with category 3 cable for lower power levels. In one embodiment, the disclosed system operates at non-standard voltage and power.

In the illustrated embodiment, two network servers 10 are provided, each of which can service a subset of room terminals, and each of which is coupled to a PoE/Switch 12. The network servers 10, which may include a TCP/IP gateway, may provide connections to one or more devices operating on a local operating network (LON) 16 and/or a local area network (LAN) 18. Many traditional (i.e., legacy) hospital communications systems utilize other non-TCP/IP communication architectures, and as such the disclosed backup communication system may include features that enable it to interoperate with such legacy technology. The LON 16 may include connections to one or more intermediate nurses' stations 17, while the LAN 18 may facilitate connection to local workstations throughout the hospital. In one embodiment, the LAN provides a connection to a centralized nurses' station 24 running a variety of system control, monitoring and/or data processing software.

A room controller 20 can be provided to receive communications from one or more room terminals 4 via the backup communication system 28 via wire 5, and to send those communications to one or more devices (such as zone lamp 22 and intermediate nurses' station 17) connected on the LON 16. As will be understood, the room controller 20 and zone lamp 22 may be devices that are located on a legacy communications system such as the LON 16. The room controller 20 is normally configured to control one or more functions of a patient room terminal 4, while the zone lamp 22 is connected to the room controller 20 and is typically used to convey specific patient call information (e.g., via a colored-coded light) to hospital personnel located in a hallway. Room controller 20 can direct calls from devices on the LON 16 such as, for example, the intermediate nurses' station 17, via the backup communication system 28 to one or more room terminals 4. These communications can also be routed to the centralized nurses' station 24 via the LAN 18.

In the illustrated embodiment, the system 1 includes a pair of PoE/Switches 12 coupled to respective sets of room terminals 4. It will be appreciated that the system 1 may include fewer or greater than two PoE/Switches 12, and that each switch may be associated with one or more room terminals 4. The PoE/Switches 12 are illustrated as being connected to independent power supplies 26, though a single power supply can be provided for both. As will be appreciated, in addition to facilitating data communications to and from the room terminals 4 via the Ethernet cables 2, the PoE/Switches also function to convey power over the Ethernet cables 2 to power the devices associated with the room terminals 4. Thus arranged, the power lines 3 are monitored for calls initiated by one or more of the patient call devices 6, and reports those calls to a variety of locations throughout the system. As noted, the calls can be transmitted to the intermediate nurses' station 17 on the LON 16 via the room controller 20. The system 1 can also operate to route call information from a device on the LON 16, to the patient call devices 6 in the originating patient room as well as other patient rooms.

Figure 1B:
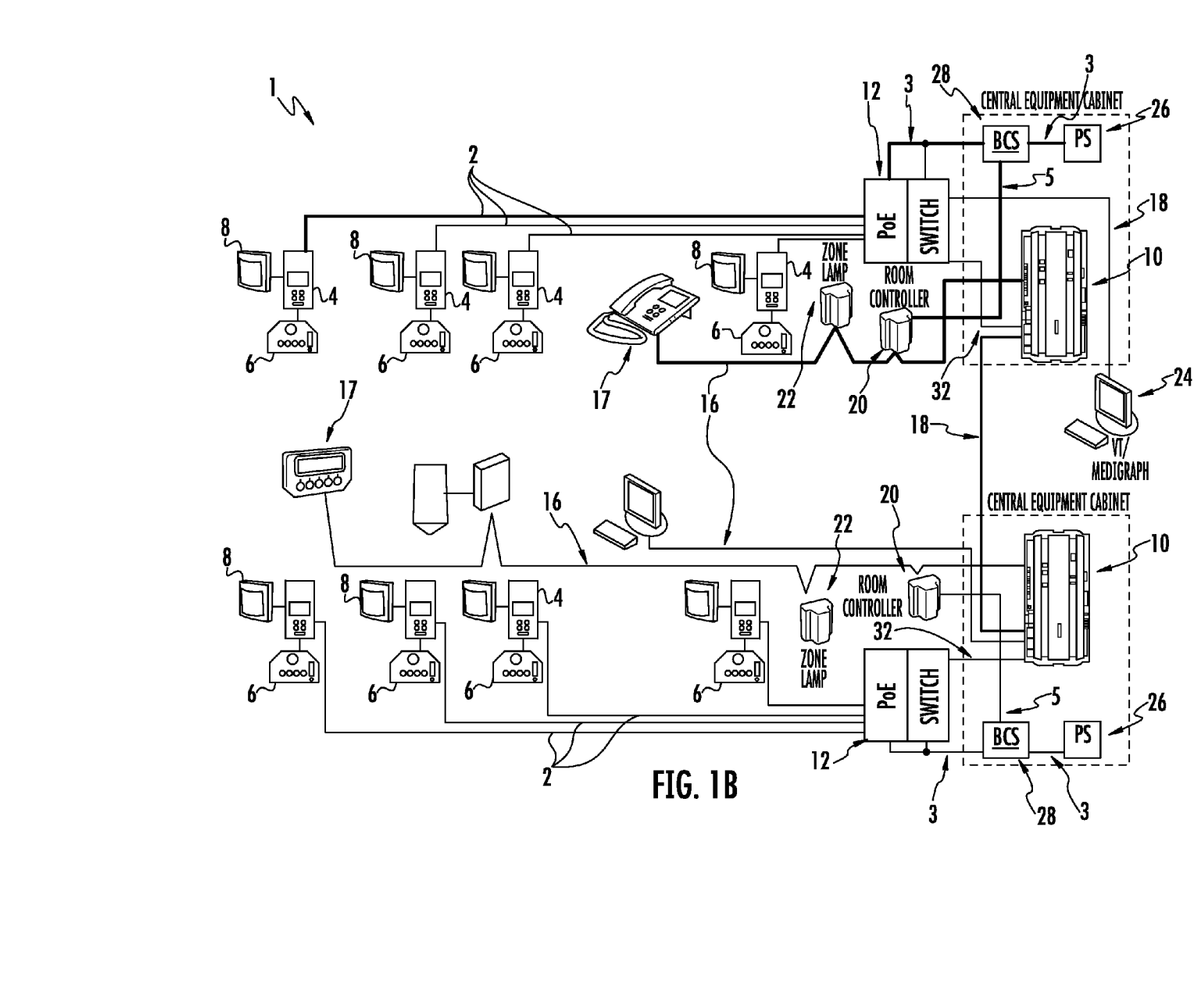
FIG. 1B is the schematic of the communications system of FIG. 1A showing an exemplary backup communications mode.

FIG. 1A shows an exemplary "normal" communications path (in bold) through the system 1 when an "event" is signaled from a patient call device 6. The room terminal 4 associated with the patient call device 6 sends a signal on a primary communication mode of the Ethernet wiring 2, through the PoE/Switch 12, across the Ethernet wiring 32 to the gateway 10, then to the LON 16 where the zone lamps 22 and the nurses' station 17 reside. The event signal can also be passed between gateways via Ethernet cable 18, and out to devices located on the LAN and LON associated with the second gateway. FIG. 1B shows an exemplary "backup" communication path (in bold) when an "event" is signaled from the same patient call device 6. This time room terminal 4 associated with the patient call device 6 sends a signal on of power carrying wires of the Ethernet cable 2, through the Poe/Switch 12 to the BCS 28 via power wires 3. The signal is then passed via signal wires 5 to the room controller 20, and to the LON were the zone lamp 22 and nurses' station 17 resides. Reverse communications (i.e., from nurses' station 17 to one or more room terminals 4) can use the same path.

Figure 2:
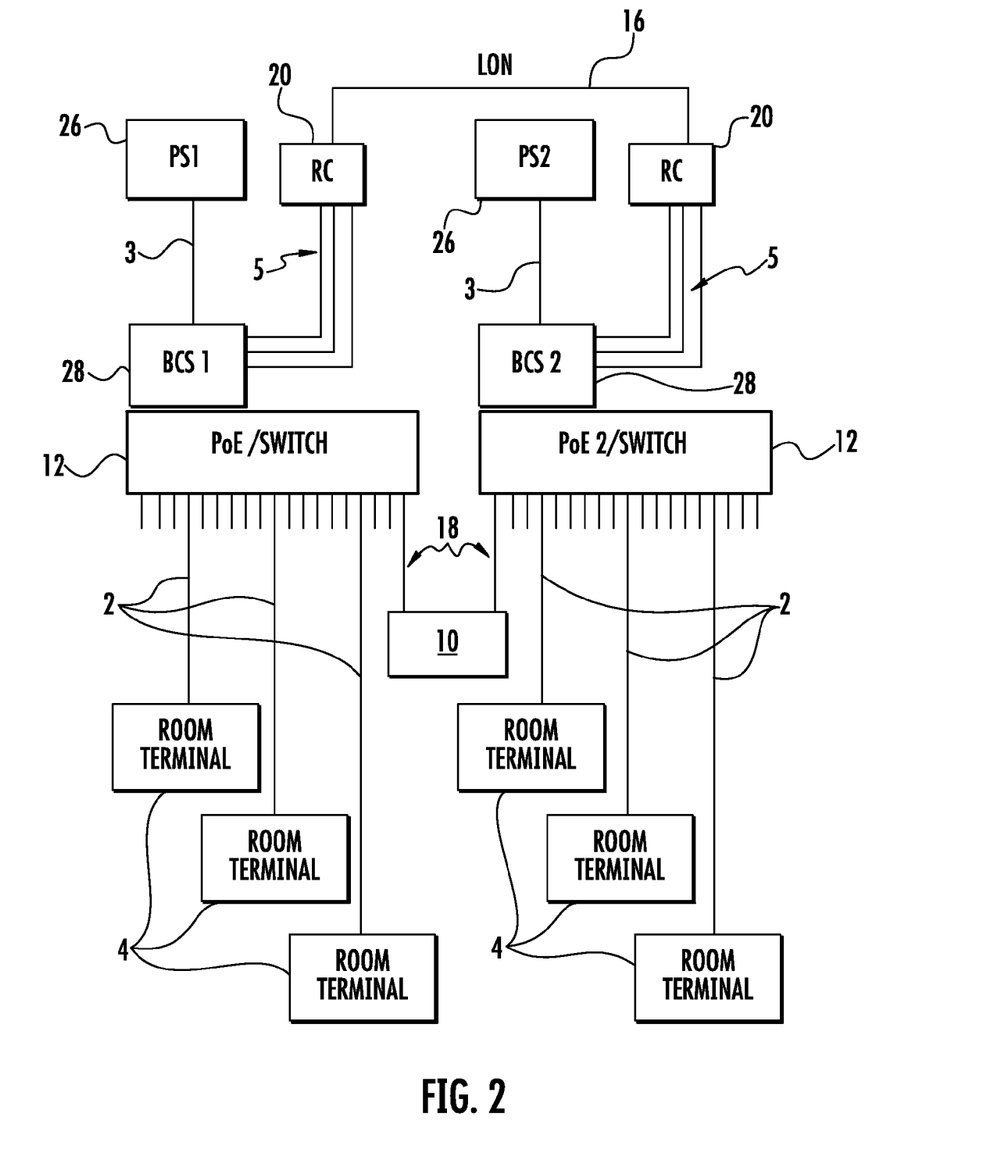
FIG. 2 illustrates an exemplary wiring arrangement for a backup communication system portion of the system of FIG. 1A.

As previously noted, it is important that communications be maintained between the room terminals and one or more nurses' stations 17, 24 even in the event that normal TCP/IP communications modes are not functioning. Thus, a backup communication system 28 is provided to enable communication between various components of the system 1 when normal TCP/IP communications are non-functional. The backup communication system (BCS) 28 may be coupled between the PoE/Switch 12 and its associated power supply 26 via power supply line 3. As shown in FIGS. 1A and 2, the backup communication system 28 is also coupled between the PoE/Switch 12 and a respective room controller 20 via signal line 5.

In the embodiment illustrated in FIG. 1A, the backup communication system 28 is a separate module from the PoE/Switch 12 located within a central equipment cabinet. It will be appreciated, however, that the location of the backup communication system 28 is not critical, and it could be located outside the cabinet and/or provided as an independently functioning module within the PoE/Switch 12, as shown in FIG. 2. In either arrangement, the backup communication system 28 can be capable of applying and detecting basic call information on the power supply line 3, as will be described in greater detail later. This basic call information can include several types of calls, including normal patient calls, emergency patient calls, and code calls (i.e., life threatening calls such as patient not breathing, or patient cardiac arrest). The backup communication system 28 can also enable such information to be communicated between individual room terminals 4, and can provide an interface between room terminals 4 and devices connected on the LON 16. The LON interfacing approach may be in the form of a standard call line output for interfacing to the room controller 20 and a circuit capable of responding to lamp outputs from the room controller 20.

Although two PoE/switches 12 are illustrated, the backup communication system 28 can interconnect a multiplicity of PoE/switches 12 for the purpose of sharing information throughout the patient communication system 1 when the normal TCP/IP communication mode is nonfunctional. In one embodiment, a single room controller 20, is used per logical group of PoE/switches 12. A "logical group" of PoE/switches 12 can be defined as a unit or as a zone, as desired for individual applications. This can be advantageous where the overall system 1 covers many physical areas (e.g., hallways, buildings), or logical groups (e.g., surgery, labor & delivery, recovery), and where it may be desirable that a particular call not be annunciated across all the areas and/or groups.

FIG. 2 shows an exemplary interconnection between the backup communications system 28, PoE/Switches 12, LON 16 and TCP/IP gateway 10 which is used to enable normal network intelligent communications throughout the patient communication system 1 of FIG. 1. In the illustrated embodiment, the backup communication system 28 is coupled to the room controller 20 via signal lines 5 to enable backup communication signals to be transmitted to the LON 16. Signals from the LON 16 can also be returned to the backup communication system 28 via the room controller 20. The PoE/Switches 12 can be interconnected via an interswitch cascading bus (not shown) so as to enable communications between the backup communication system 28 associated with each switch (i.e., to enable room terminals 4 to communicate with each other). Alternatively, the LON 16 can be used to communicate information between PoE/Switches 12. Ethernet wiring 2 couples the room terminals 4 to the PoE/switches 12. As previously noted, the Ethernet wiring 2 may also supply operational power to the room terminals 4, including the patient call devices 6 and room lights 8. The PoE/switches 12 are coupled to the TCP/IP gateway 10 via Ethernet cables 32.

As previously noted, the backup communication system 28 can reside within the respective PoE/Switch 12, or it can be separate from the respective PoE/Switch 12. As will be appreciated, integrating the backup communication system 28 into the PoE/Switch 12 can reduce cost and simplify wiring. By contrast, separating them may allow using an off the shelf Ethernet Switch and may also increase wiring flexibility.

FIG. 2 also illustrates room controller 20 connected to transmit calls between the backup communication system 28 and the LON 16. FIG. 1 shows two physical LONs that are logically connected via the Ethernet cable 18 used to connect the gateways 10 so that calls from devices on one physical LON can be transmitted to devices on the other physical LON. As previously noted, the room controller can function to receive signals from the backup communication system 28 (i.e., TCP/IP) and relay them to the LON (i.e., non-TCP/IP) side of the system 1 so that nurses and personnel at other locations can be aware of emergency call condition, as necessary. It will be appreciated that it is not critical that a separate room controller and zone lamp be provided. Instead, a hybrid device could be used that combines the zone light and room controller functionality. Likewise, the BCS may transmit call information directly to an annunciating lamp or sounder via additional wiring (not shown).

Figure 3:
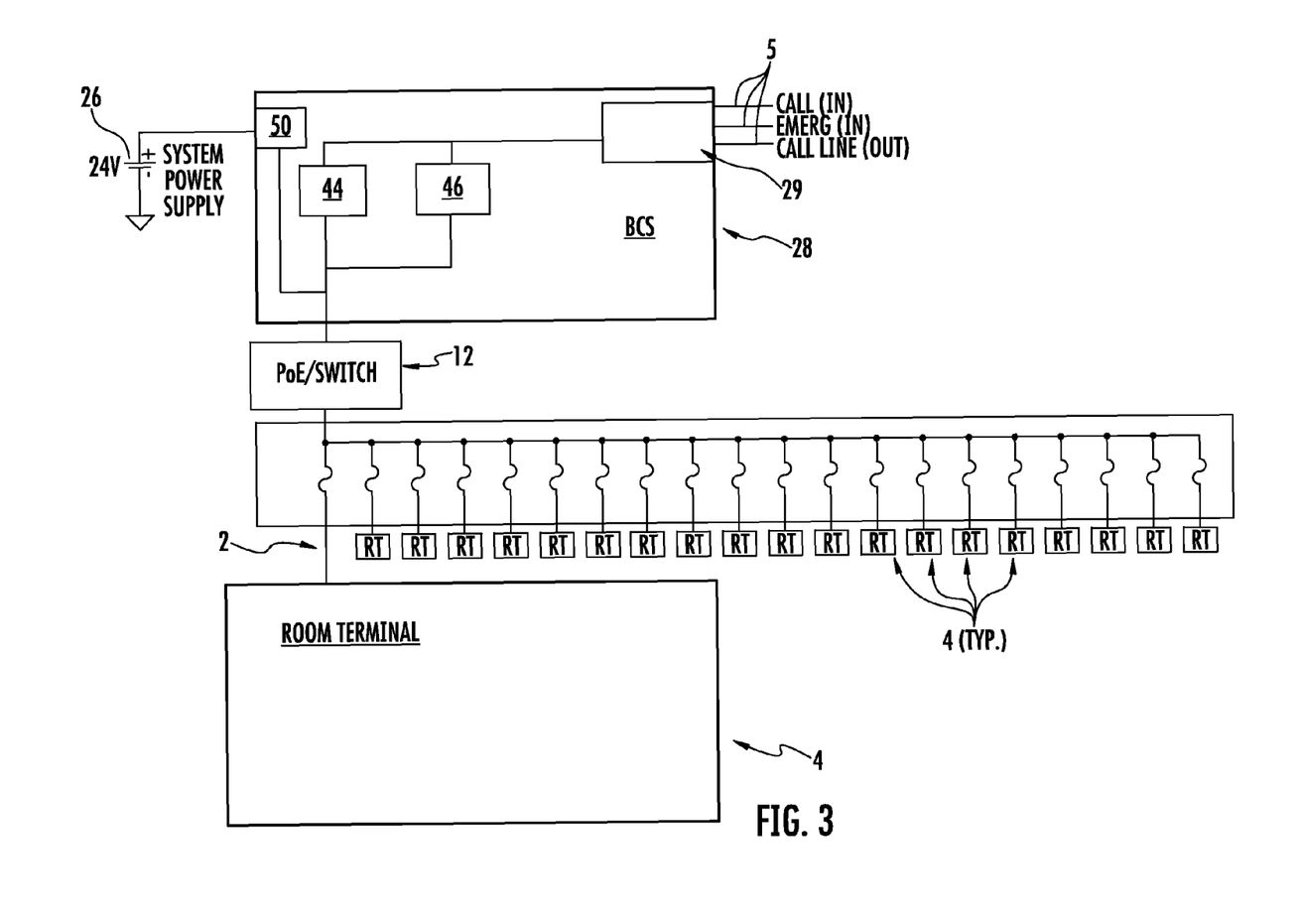
FIG. 3 is a block diagram illustrating a first embodiment of the disclosed backup communication system and its integration with portions of the communications system of FIG. 1A.

Referring now to FIG. 3, an embodiment of the disclosed backup communication system 28 is shown. As illustrated, the backup communication system 28 is a module separate from the PoE/Switch 12, however, this is not critical and the backup communication system 28 could instead be integrated into the PoE/Switch 12, as previously noted. The backup communication system 28 is coupled via PoE/Switch 12 to a plurality of room terminals through Ethernet cables 2.

The backup communication system 28 of this embodiment can employ pulse-coded AC signals coupled onto the power wires of the Ethernet cable 2 between the room terminals 4 and the BCS 28. These pulse-coded AC signals can serve to transmit call information between the room terminals 4 to the backup communication system 28. As such, the room terminal 4 and the backup communication system 28 may each include associated transmit and receive circuitry. The backup communication system 28 may include a system processor 29 that is configured to process the call signal information received from the room terminal 4 and to transmit a representative signal to the room controller 20 via signal line 5 which may be a generic call line input of the room controller 20. The room controller 20, in turn, can provide signals to the nurses' station 17 on the LON 16 in the manner previously described. The processor 29 may also process incoming calls from the room controller 20.

Figure 4:
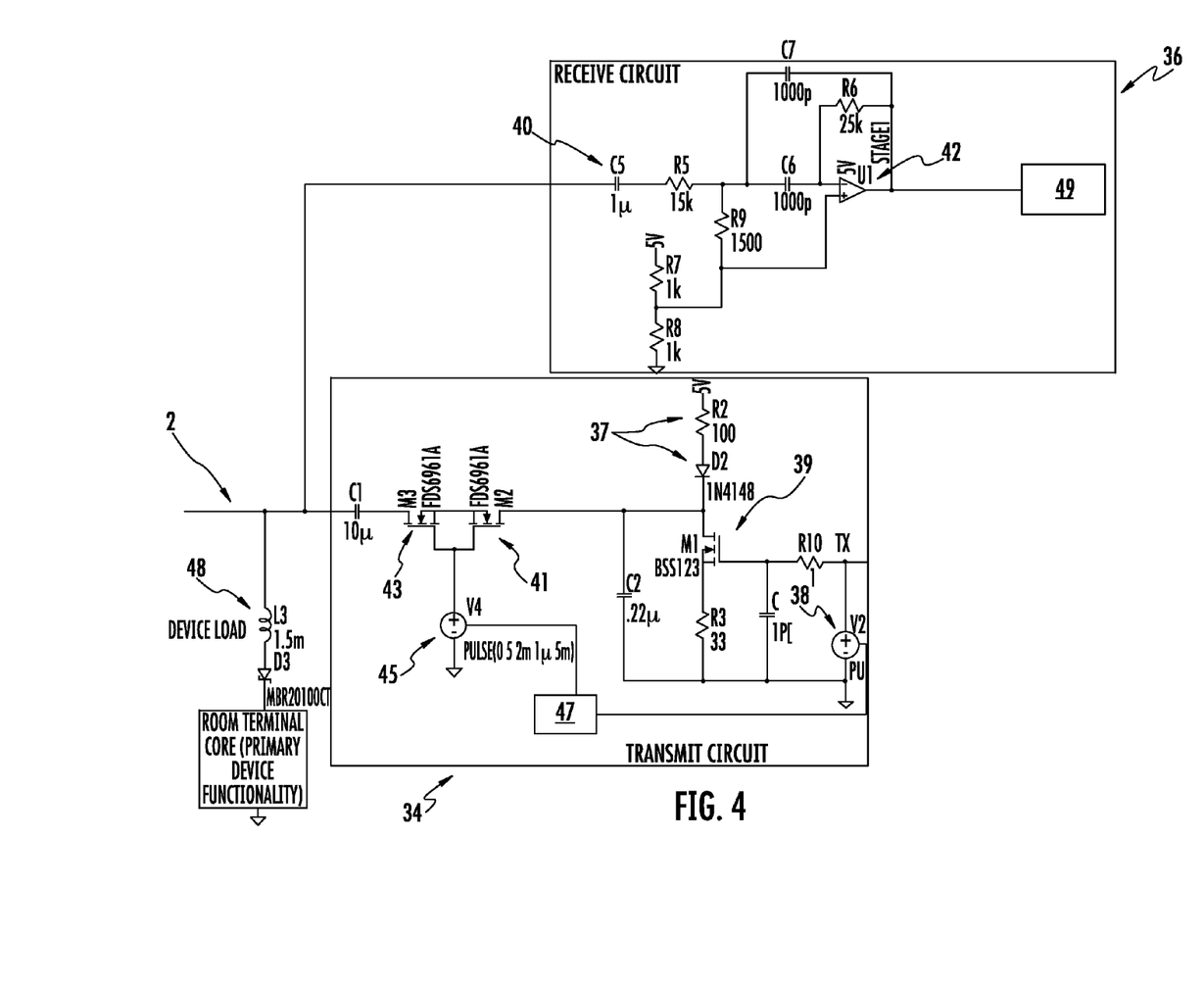
FIG. 4 is a schematic of an exemplary room terminal for use with the first embodiment of the backup communication system of FIG. 3.

FIG. 4 shows an exemplary transmit circuit 34 and an exemplary receive circuit 36 for the room terminal 4. As noted, the transmit circuit 34 can operate to transmit signals to the backup communication system 28 on the power wires of the Ethernet cable 2. The transmit circuit 34 may include a signal generator 38, such as an astable multivibrator, which can generate a low-impedance AC signal through a first FET 39 and its associated biasing components, which in the illustrated embodiments include a resistor and diode combination 37. This AC signal is coupled to the power wires of Ethernet cable 2 through second and third FETs 41, 43, which enable disconnection of the signal driver when not required (i.e., when there are no active calls). Activation of signal control (via 45) and signal input (via 38) for the sake of generating a call signal would be controlled via a microcontroller 47.

Thus arranged, the transmit circuit 34 may inject a signal on the power wires of the Ethernet cable 2 that is representative of a patient call. The injected signal can be representative of a particular type of patient call (e.g., normal call, emergency call, code call). For example, periodic pulses of injected AC signal could be used to identify a particular call. In one non-limiting example, a 50 millisecond (ms) pulse every 500 ms could represent a patient call, a 100 ms pulse every 500 ms could represent an emergency call, and a 150 ms pulse every 500 ms could represent a code call. Other pulse schemes can, of course, be used. It will be appreciated that other call signaling schemes can be used in lieu of pulse coding. For example, other AC signal modulation schemes such as frequency-shift keying (FSK), dual-tone multi-frequency signaling (DTMF), phase-shift keying (PSK), FM, AM, or the like could be used.

To receive call signals back from the backup communication system 28, the receive circuit 36 may include a DC-blocking filter (i.e., capacitor) 40 and an operational amplifier 42. Operational amplifier 42 is configured to filter the AC signal coupled via capacitor 40 such that it passes only the desired AC frequency-band. This AC output could then enter a simple rectified resistor-capacitor filter circuit. The amplitude of the rectified output is then compared to a predetermined threshold to determine the presence or absence of the backup communication signal.

The backup communication system 28 may include transmit and receive circuits 44, 46 that include substantially the same components, which function in substantially the same way, as those described in relation to the transmit and receive circuits 34, 36 of the room terminal 4, and thus they will not be described in detail. The transmit and receive circuits 44, 46 of the backup communication system 28 may be coupled to the system processor 29. Thus, the processor 29 is coupled to the receive circuit 46 for evaluating the sensed AC signal received from the room terminal 4, and for generating an output signal to the room controller 20, via line 5 representative of that received call signal. The room controller 20 can then transmit a representative signal to the LON 16, where it can be received and recognized by the nurses' station 17 as a call from the particular room terminal.

If the nurses' station 17 (or other intermediate station) sends a call back to the room terminal 4 (either the room terminal that generated the original call, or other room terminals in the vicinity), the system processor instructs operation of the signal generator associated with the transmit circuit 44, and an appropriate pulse-coded AC signal is injected onto the power wires of the Ethernet cable and sent along to one or more room terminals 4, where the signal is received and decoded by the terminal's receive circuit 36. In one non-limiting exemplary embodiment, the frequency of the AC signal is between 30 kHz and 80 kHz. In addition to the transmit and receive circuits 34 and 36, the backup communication system 28 and room terminal 4 may each have an inductor 48, 50 to isolate the system power supply 26 from the AC signal pulse on the power wires of the Ethernet cable 2.

Figure 5:
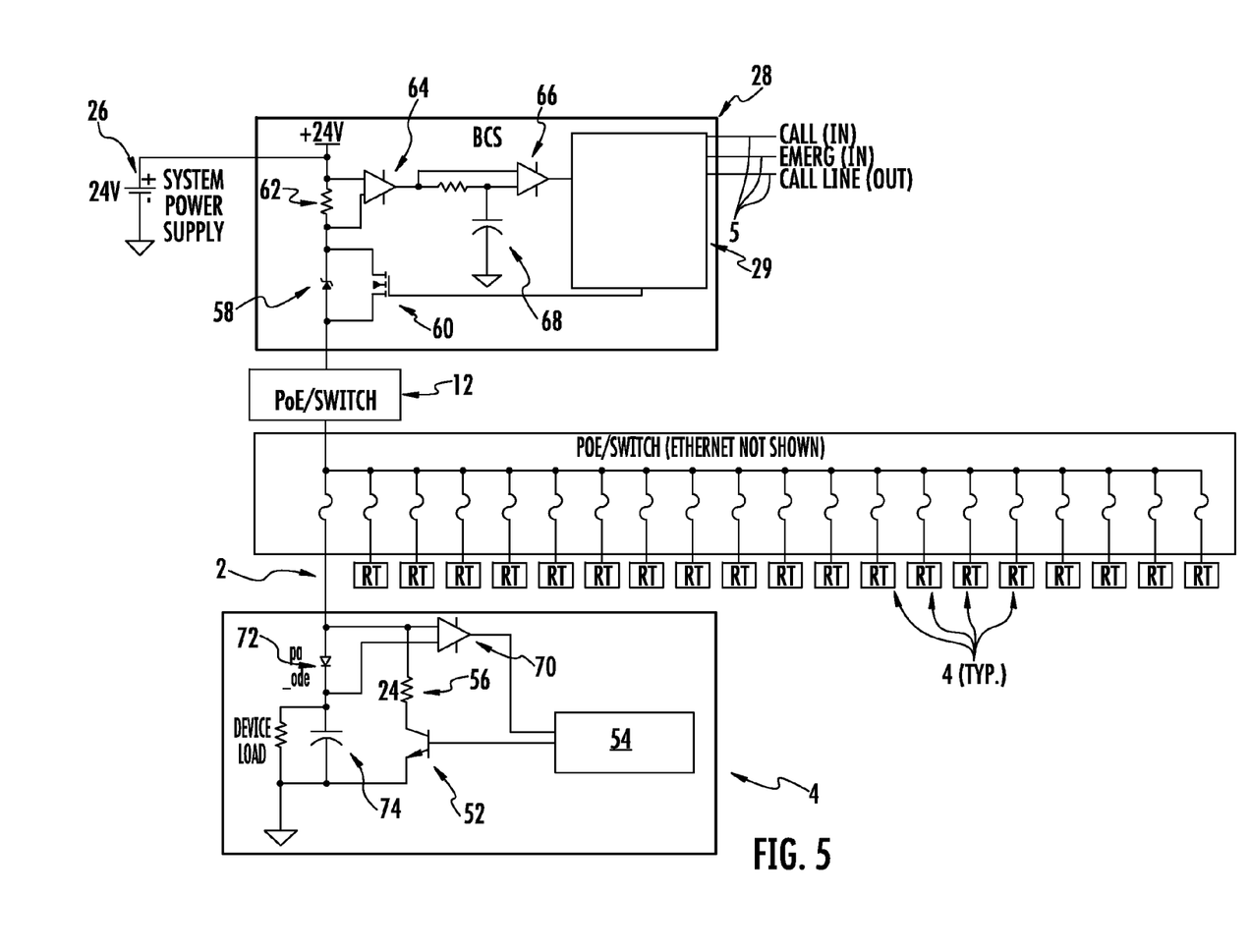
FIG. 5 is a block diagram illustrating a second embodiment of the disclosed backup communication system and its integration with portions of the communication system of FIG. 1A.

FIG. 5 shows another embodiment of the disclosed backup communication system 28 in which patient call information is communicating over the power wires of the Ethernet cable using current coded data in one direction (i.e., room terminal 4 to backup communication system 28) and voltage-coded data in the other direction (i.e., backup communication system 28 to room terminal 4). Thus, the room terminal 4 can include a transistor 52 that is drivable in one of three ways (representing a normal patient call, an emergency patient call, and a code call, respectively) to communicate the call to the backup communication system 28.

A processor 54 can pulse the transistor 52 according to call level. For example, a 1 ms pulse every 500 ms could indicate a normal patient call, a 1 ms pulse every 200 ms could indicate a patient emergency call, and a 1 ms pulse every 100 ms could indicate a code call. When the transistor is pulsed, a current additional to the device load is consumed via the resistor 56. The backup communication system 28 can include a resistor 62, which in one embodiment is a very small impedance resistor, such as a sub-ohm level resistor. A first operational amplifier 64 can be positioned across the resistor 62 for amplifying voltage drops across the resistor. A second op-amp 66 is provided, and takes input from the first op amp 64, and from a capacitor 68 which normally holds a voltage representative of average current being drawn. In operation, when a current pulse (i.e., a call signal) is received from the room terminal 4, the first op amp 64 senses a significant increase in voltage drop across the resistor 62. The second op amp 66 senses this instantaneous voltage from the first op amp 64 and generates a signal representative of the dynamic change of the current. The second op amp 66 is coupled to the processor 29, which observes this transient current and can identify it as a pulse pattern representative of a particular call type (i.e., patient call, patient emergency call, or code call).

The backup communication system 28 may also be configured to transmit call information back to the room terminal 4. As previously noted, this call information may be received via the room controller 20 from any of a variety of devices connected to the LON 16. The system processor 29 can be used to implement this return signaling to the room terminal 4. In one embodiment, the backup communication system 28 normally shunts a zener diode 58 with an FET 60 so as not to affect the normal delivery of power. Then, when the backup communication system 28 needs to transmit calls, it can momentarily turn off the FET 60 (for example, using the same timing as noted above to indicate a particular call type) and hence momentarily lower the voltage delivered to the room terminal 4. It will be appreciated that the zener diode 58 could be replaced by appropriate resistors or other circuit capable of dropping a certain voltage. The room terminal 4 can include an operational amplifier 70 takes line voltage directly through a top connection to the PoE/Switch 12, and takes the average line voltage through a bottom connection via diode 72 and capacitor 74. In operation, the FET 60 is normally on, and shorting power to the room terminal 4. When a sudden voltage drop is occurs (such as when a signal pulse is received from the backup communication system 28), the op amp 70 will sense it, and will output it to the processor 54, which will observe this transient current and can identify it as a pulse pattern representative of a particular call type.

Figure 6:
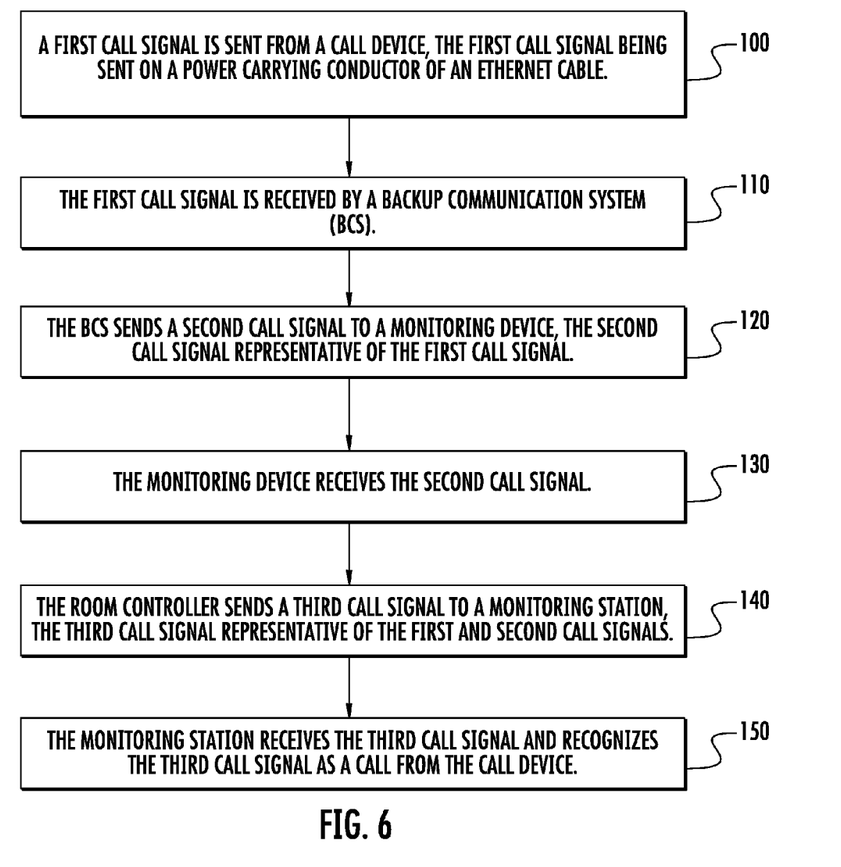
FIG. 6 is a flow chart illustrating a first embodiment of a method of operating the disclosed backup communication system.

Referring now to FIG. 6, an exemplary method of operating the first embodiment of the disclosed backup communication system 28 will be described. In one embodiment, the backup communication system 28 functionality is constantly "on," even when the primary system is working. It will be appreciated, however, that such "constant on" functionality is not critical. For example, the room terminals 4 may be employed to recognize a failure in the gateway 10 and "turn on" the backup communication system 28. In one embodiment, the room terminals 4 could send a sync pulse to indicate that a failure of the gateway 10 has occurred. The backup communication system 28 could recognize the sync pulse and begin transmitting information in backup mode.

At step 100, a first call signal is sent from a call device, such as by a patient or nurse pressing a call button. The first call signal is sent on a power carrying conductor of an Ethernet cable. At step 110, the first call signal is received at a backup communication system (BCS). At step 120, the BCS sends a second call signal to a monitoring device via a signal wire. In one embodiment, the monitoring device is a room controller, and the second call signal is representative of the first call signal. At step 130, the monitoring device receives the second call signal. At step 140, the monitoring device sends a third call signal to a monitoring station, which in one embodiment is a nurses' station, the third call signal representative of the first and second call signals. At step 150, the monitoring station receives the third call signal and recognizes the third call signal as a call from the call device. Although the monitoring device is described as being a room controller, it will be appreciated that the monitoring device could instead be any of a variety of devices that can use the received information to inform a user that a patient call device has initiated a call. A non-limiting list of such monitoring devices include an annunciation device, a personal computer (PC), a lighting device, and a local or remote sounder.

Figure 7:
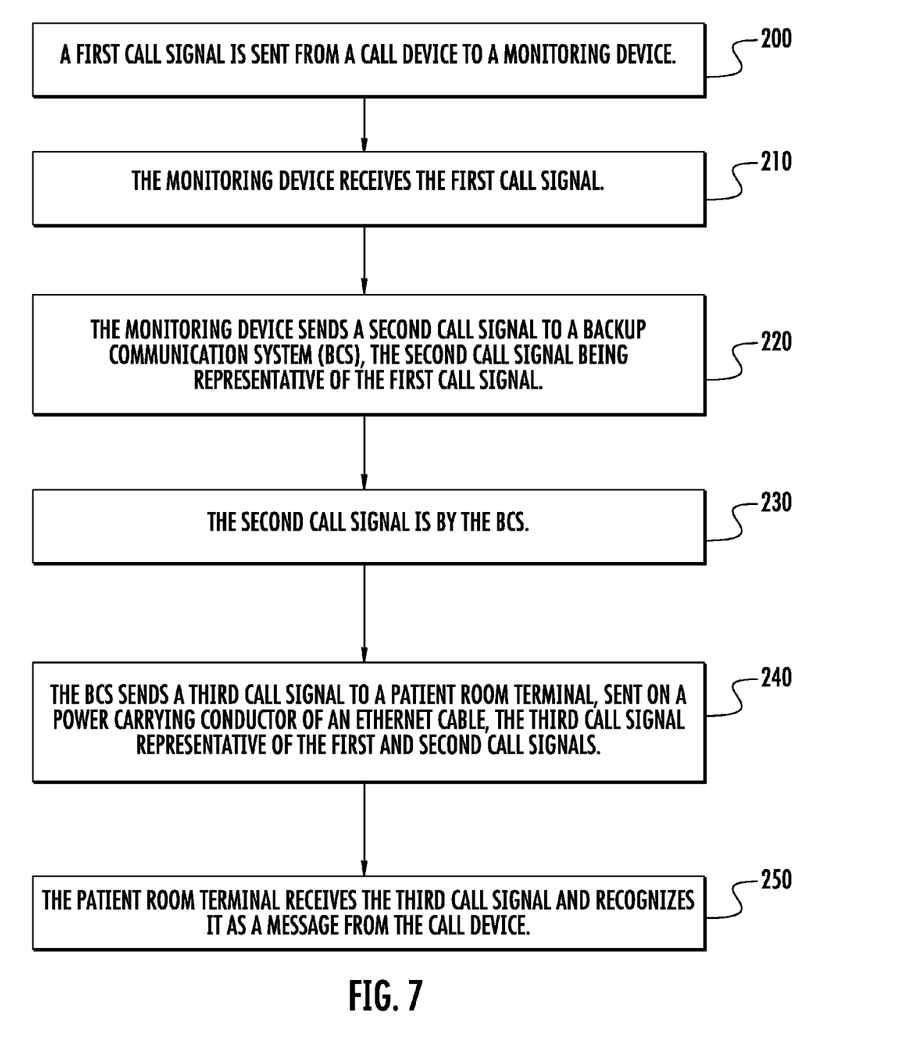
FIG. 7 is a flow chart illustrating a second embodiment of operating the disclosed backup communication system.

Referring now to FIG. 7, a second exemplary method of operating the second embodiment of the disclosed backup communication system 28 will be described. At step 200, a first call signal is sent from a call device to a monitoring device, which in one embodiment is a room controller. At step 210, the monitoring device receives the first signal. At step 220, the monitoring device sends a second call signal to a backup communication system (BCS), the second call signal being representative of the first call signal. At step 230, the second call signal is received by the BCS. At step 240, the BCS sends a third call signal to a patient room terminal, where the third call signal is sent on a power carrying conductor of an Ethernet cable. The third call signal representative of the first and second call signals. At step 250, the patient room terminal receives the third call signal and recognizes it as a message from the call device.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. The term computer is not limited to just those integrated circuits referred to in the art as computers, but broadly refers to, microprocessors, microcontrollers, microcomputers, programmable logic controllers, application specific integrated circuits, and other programmable circuits, and these terms are used interchangeably herein.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto

The invention claimed is:

1. A method for providing backup communication, comprising:
   determining whether TCP/IP communication using a TCP/IP gateway coupled between a Power over Ethernet (PoE) switch, a call device, and a monitoring device is nonfunctional;
   receiving, at a backup communication system (BCS) module coupled between the PoE switch and the monitoring device, a first call signal from the call device based on the determination that TCP/IP communication between the call device and the monitoring device is nonfunctional; and
   transmitting, from the BCS module, a second call signal to the monitoring device, said second call signal representative of said first call signal;
   wherein the first call signal is transmitted on a power carrying wire of an Ethernet cable and wherein said second call signal is transmitted on a signal wire, said signal wire different than said Ethernet cable.

2. The method of claim 1, wherein the first call signal comprises voltage coded information.

3. The method of claim 2, wherein the voltage-coded information includes a voltage representative of a predetermined patient event.

4. The method of claim 3, wherein the voltage-coded information represents a call selected from the list consisting of a patient call, a patient emergency call, and a code call.

5. The method of claim 1, wherein the first call signal comprises current coded information.

6. The method of claim 5, wherein the current coded information represents a call selected from the list consisting of a patient call, a patient emergency call, and a code call.

7. The method of claim 1, further comprising sending, from the monitoring device, a third call signal to a monitoring station, wherein the third call signal is representative of the first and second call signals.

8. The method of claim 7, wherein the monitoring station recognizes the third call signal as a predetermined patient event initiated at a patient room associated with the patient call device.

9. The method of claim 8, wherein the monitoring device is configured to convert the second call signal to a format recognizable by the monitoring station.

10. The method of claim 1, wherein the first call signal comprises current coded information or voltage coded information, the current coded information comprising a predetermined series of current pulses representative of a predetermined patient call type, the voltage coded information comprising a predetermined series of voltage pulses representative of a predetermined patient call type.

11. The method of claim 1, wherein the call device, the BCS module and the monitoring station are part of a local operating network in a hospital.

12. A system for providing backup communication over an Ethernet cable, comprising:
   a backup communication system (BCS) module for receiving a first call signal from a patient room terminal, the BCS module coupled between a Power over Ethernet (PoE) switch and a monitoring device;
   the BSC module configured to determine whether TCP/IP communication between the patient room terminal and the monitoring device using a TCP/IP gateway coupled between the PoE switch and the monitoring device is nonfunctional; and
   the BSC module configured to transmit a second call signal to a monitoring device based on the determination that TCP/IP communication between the patient room terminal and the monitoring device is nonfunctional, said second call signal representative of the first call signal;
   wherein said first call signal is transmitted on a power carrying wire of an Ethernet cable and wherein said second call signal is transmitted on a signal wire, said signal wire different than said Ethernet cable.

13. The system of claim 12, wherein the first call signal comprises voltage coded information.

14. The system of claim 13, wherein the voltage-coded information includes a voltage representative of a predetermined patient event.

15. The system of claim 14, wherein the voltage-coded information represents a call selected from the list consisting of a patient call, a patient emergency call, and a code call.

16. The system of claim 12, wherein the first call signal comprises current coded information.

17. The system of claim 16, wherein the current coded information represents a call selected from the list consisting of a patient call, a patient emergency call, and a code call.

18. The system of claim 12, wherein the monitoring device is configured to transmit a third call signal to a monitoring station, wherein the third call signal is representative of the first and second call signals.

19. The system of claim 18, wherein the monitoring station recognizes the third call signal as a predetermined patient event initiated at a patient room associated with the patient call device.

20. The system of claim 19, wherein the monitoring device is configured to convert the second call signal to a format recognizable by the monitoring station.

21. The system of claim 12, wherein the patient room terminal, the BCS module, and the monitoring device are part of a local operating network in a hospital.

22. A system for providing backup communication over an Ethernet cable, comprising:

a backup communication system (BCS) module for receiving a first call signal from a patient room terminal;

the BSC module configured to determine whether TCP/IP communication between the patient room terminal and a monitoring device using a TCP/IP gateway is nonfunctional; and the BSC module configured to transmit a second call signal to a monitoring device based on the determination that TCP/IP communication between the patient room terminal and the monitoring device is nonfunctional, said second call signal representative of the first call signal;

wherein said first call signal is transmitted on a power carrying wire of an Ethernet cable, wherein said second call signal is transmitted on a signal wire, said signal wire different than said Ethernet cable, and wherein the first call signal comprises current-coded information or voltage-coded information, the current-coded information comprising a predetermined series of current pulses representative of a predetermined-patient call type, the voltage-coded information comprising a predetermined series of voltage pulses representative of a predetermined patient call type.

23. The system of claim 22, wherein the current-coded information comprises a plurality of AC pulses.

* * * * *